United States Patent
Alon et al.

(10) Patent No.: US 9,818,229 B2
(45) Date of Patent: *Nov. 14, 2017

(54) ANCHORS FOR LOCATION-BASED NAVIGATION AND AUGMENTED REALITY APPLICATIONS

(71) Applicant: SODYO LTD., Binyamina (IL)

(72) Inventors: Alex Alon, Binyamina (IL); Irina Alon, Binyamina (IL); Yariv Haddad, Ra'anana (IL); Yoav Yadin, Ganei Tikva (IL)

(73) Assignee: SODYO LTD., Binyamina (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,414

(22) Filed: Jul. 27, 2016

(65) Prior Publication Data
US 2016/0335805 A1 Nov. 17, 2016

Related U.S. Application Data

(63) Continuation of application No. 14/404,641, filed as application No. PCT/IB2013/054540 on Jun. 2, 2013, now Pat. No. 9,437,046.

(Continued)

(51) Int. Cl.
| | |
|---|---|
| G09G 5/02 | (2006.01) |
| G06T 19/00 | (2011.01) |
| G06K 7/12 | (2006.01) |
| G06K 19/06 | (2006.01) |
| G01C 21/20 | (2006.01) |
| G06K 7/14 | (2006.01) |
| H04W 4/02 | (2009.01) |
| G06T 7/90 | (2017.01) |

(52) U.S. Cl.
CPC .......... G06T 19/006 (2013.01); G01C 21/206 (2013.01); G06K 7/12 (2013.01); G06K 7/1417 (2013.01); G06K 19/0614 (2013.01); G06T 7/90 (2017.01); H04W 4/02 (2013.01)

(58) Field of Classification Search
CPC ....... G06T 19/006; G06T 7/90; G01C 21/206; G06K 7/12; G06K 7/1417; G06K 19/0614; H04W 4/02
USPC .......................... 345/619, 632, 633, 634, 641
See application file for complete search history.

(56) References Cited

U.S. PATENT DOCUMENTS

| | | | |
|---|---|---|---|
| 7,516,421 B2 | 4/2009 | Asano et al. | |
| 2007/0051813 A1* | 3/2007 | Kiuchi | G06K 7/1417 235/462.1 |

(Continued)

FOREIGN PATENT DOCUMENTS

WO 2012120524 A2 9/2012

OTHER PUBLICATIONS

JP Application # 2015-515618 Office Action dated Feb. 22, 2017.
European Application # 14868144.8 Search Report dated Jun. 6, 2017.

*Primary Examiner* — Xiao Wu
*Assistant Examiner* — Sarah Lhymn
(74) *Attorney, Agent, or Firm* — D. Kligler IP Services Ltd.

(57) ABSTRACT

A method for encoding information includes specifying a digital value and providing a symbol (28, 70, 80, 90, 100) comprising a plurality of polygons (72, 82, 92, 94, 102) meeting at a common vertex (74, 84, 96, 98, 104) and having different, respective colors selected so as to encode the specified digital value.

16 Claims, 5 Drawing Sheets

Related U.S. Application Data

(60) Provisional application No. 61/656,029, filed on Jun. 6, 2012.

(56) References Cited

U.S. PATENT DOCUMENTS

| | | | |
|---|---|---|---|
| 2009/0148037 A1* | 6/2009 | Moriyama | G01C 15/02 382/154 |
| 2012/0039529 A1* | 2/2012 | Rujan | G06K 7/1417 382/164 |

* cited by examiner

ANCHORS FOR LOCATION-BASED NAVIGATION AND AUGMENTED REALITY APPLICATIONS

CROSS-REFERENCE TO RELATED APPLICATIONS

This application is a continuation of U.S. patent application Ser. No. 14/404,641, filed Dec. 1, 2014, in the national phase of PCT Patent Application PCT/IB2013/054540, filed Jun. 2, 2013, which claims the benefit of U.S. Provisional Patent Application 61/656,029, filed Jun. 6, 2012, which is incorporated herein by reference.

FIELD OF THE INVENTION

The present invention relates generally to methods, systems and software for encoding and decoding of machine-readable symbols, and particularly to the use of such symbols in providing location-based information.

BACKGROUND

A wide variety of methods and standards are known in the art for encoding information in a form that can be read by a computer using an image sensor or other type of optical sensor. The best-known standards of this sort are barcodes, including the traditional one-dimensional arrays of stripes and two-dimensional barcodes, such as QR codes.

Other types of image-based computer-readable encoding schemes and symbols have been proposed in the patent literature. Some of these schemes use color information, rather than the monochrome symbols provided by conventional barcodes. Representative examples are described in U.S. Pat. Nos. 7,936,901, 5,869,828 and 7,020,327.

SUMMARY

Embodiments of the present invention that are described herein provide improved types of computer-readable symbols, as well as methods for use of such symbols.

There is therefore provided, in accordance with an embodiment of the present invention, a method for encoding information, which includes specifying a digital value, and providing a symbol including a plurality of polygons meeting at a common vertex and having different, respective colors selected so as to encode the specified digital value.

In some embodiments, the symbol includes a tessellation having multiple vertices encoding multiple, respective digital values depending on the colors of the polygons that meet at each of the vertices, and the symbol encodes an extended digital value generated by combining the multiple, respective digital values encoded by the multiple vertices.

Typically, providing the symbol includes assigning a digital code to each color, and combining the digital codes to give the specified digital value. In a disclosed embodiment, the digital code is a three-digit code representing red, green and blue components of the colors of the polygons. The three-digit code may be a three-bit code, including a respective binary value representing each of the red, green and blue components, wherein the colors of the polygons are selected from a color group consisting of red, green, blue, cyan, magenta and yellow, and having three-bit codes (1,0,0), (0,1,0), (0,0,1), (0,1,1), (1,0,1) and (1,1,0), respectively.

The symbol may be provided without any dedicated registration marks.

In disclosed embodiments, the method includes capturing an image of the symbol, and decoding the symbol by probing the colors in the image at probe locations disposed at multiple angles around the common vertex. Typically, the probe locations are all disposed at the same distance from the common vertex.

There is also provided, in accordance with an embodiment of the present invention, a tangible medium having a symbol provided thereon in accordance with the methods described above. The symbol may be printed on the medium.

There is additionally provided, in accordance with an embodiment of the present invention, an information system, which includes multiples symbols, each symbol including a plurality of polygons meeting at a common vertex and having different, respective colors selected so that the symbols encode respective digital values. A server is configured to receive a message from a client device indicating a digital value decoded by the client device upon capturing and analyzing an image containing one of the symbols, and to provide to the client device, in response to the message, an item of information corresponding to the digital value.

In a disclosed embodiment, the multiple symbols are distributed at different, respective locations within an environment, and the server is configured to ascertain a location of the client device responsively to the digital value and to provide the item responsively to the location. Typically, the item includes a graphical element configured to be overlaid by the client device on a display of the image containing the one of the symbols.

There is further provided, in accordance with an embodiment of the present invention, a computer software product, including a tangible, non-transitory computer-readable medium in which program instructions are stored, which instructions, when read by a computing device, cause the device to capture an image of a symbol including a plurality of polygons meeting at a common vertex and having different, respective colors selected so as to encode a specified digital value, and to process the image so as to decode the digital value.

In a disclosed embodiment, the instructions cause the computing device to decode the symbol by probing the colors in the image at probe locations disposed at multiple angles around the common vertex.

There is moreover provided, in accordance with an embodiment of the present invention, a computing device, which includes an image sensor, configured to capture an image containing a symbol including a plurality of polygons meeting at a common vertex and having different, respective colors selected so as to encode a specified digital value. A processor is configured to process the image so as to decode the digital value.

In some embodiments, the device includes a display, which is coupled to display the image captured by the image sensor, wherein the processor is configured to superimpose a graphical element on the display responsively to the digital value. Additionally or alternatively, the device includes a communication interface, wherein the processor is configured to send a message containing the digital value over a network to a server via the communication interface, and to receive the graphical element from the server in response to the message.

There is furthermore provided, in accordance with an embodiment of the present invention, a method for encoding information, which includes specifying a digital value, and producing a symbol that encodes the specified digital value in a set of color elements having different, respective colors, to be identified in an image of the symbol as red, green, blue, cyan, magenta and yellow color elements, respectively. The symbol is produced by applying cyan, magenta and yellow pigments to a substrate so as to produce the color elements, such that the color elements exhibit the following red, green, and blue intensity characteristics when measured in an sRGB color space:

for the red color elements, the red intensity is greater than twice the blue and green intensities;

for the green color elements, the green intensity is greater than twice the red and blue intensities;

for the blue color elements, the blue intensity is greater than twice the red and green intensities;

for the cyan color element, the blue and green intensities are both greater than twice the red intensity;

for the magenta color element, the red and blue intensities are both greater than twice the green intensity; and for the yellow color element, the red and green intensities are both greater than twice the blue intensity.

Additionally or alternatively, the symbol is produced by applying cyan, magenta and yellow pigments to a substrate so as to produce the color elements, such that the color elements exhibit red, green, and blue intensity characteristics when measured in an sRGB color space that satisfy a relation:

$$\left(1 - \frac{H_c^0 - L_c^0}{L_c^1 - L_c^0} - \frac{H_c^1 - L_c^1}{H_c^1 - H_c^0}\right) > 0.8$$

for each color c=red, green, blue, wherein $H^1_c$ and $L^1_c$ are the highest and lowest observed values, respectively, of the color c among the color elements that are expected to contain the color c, while $H^0_c$ and $L^0_c$ are the highest and lowest observed values of the color c among the color elements that are expected not to contain the color c.

There is additionally provided, in accordance with an embodiment of the present invention, a tangible medium having a symbol provided thereon in accordance with either of the foregoing methods.

The present invention will be more fully understood from the following detailed description of the embodiments thereof, taken together with the drawings in which:

DETAILED DESCRIPTION OF EMBODIMENTS

Overview

Figure 1:
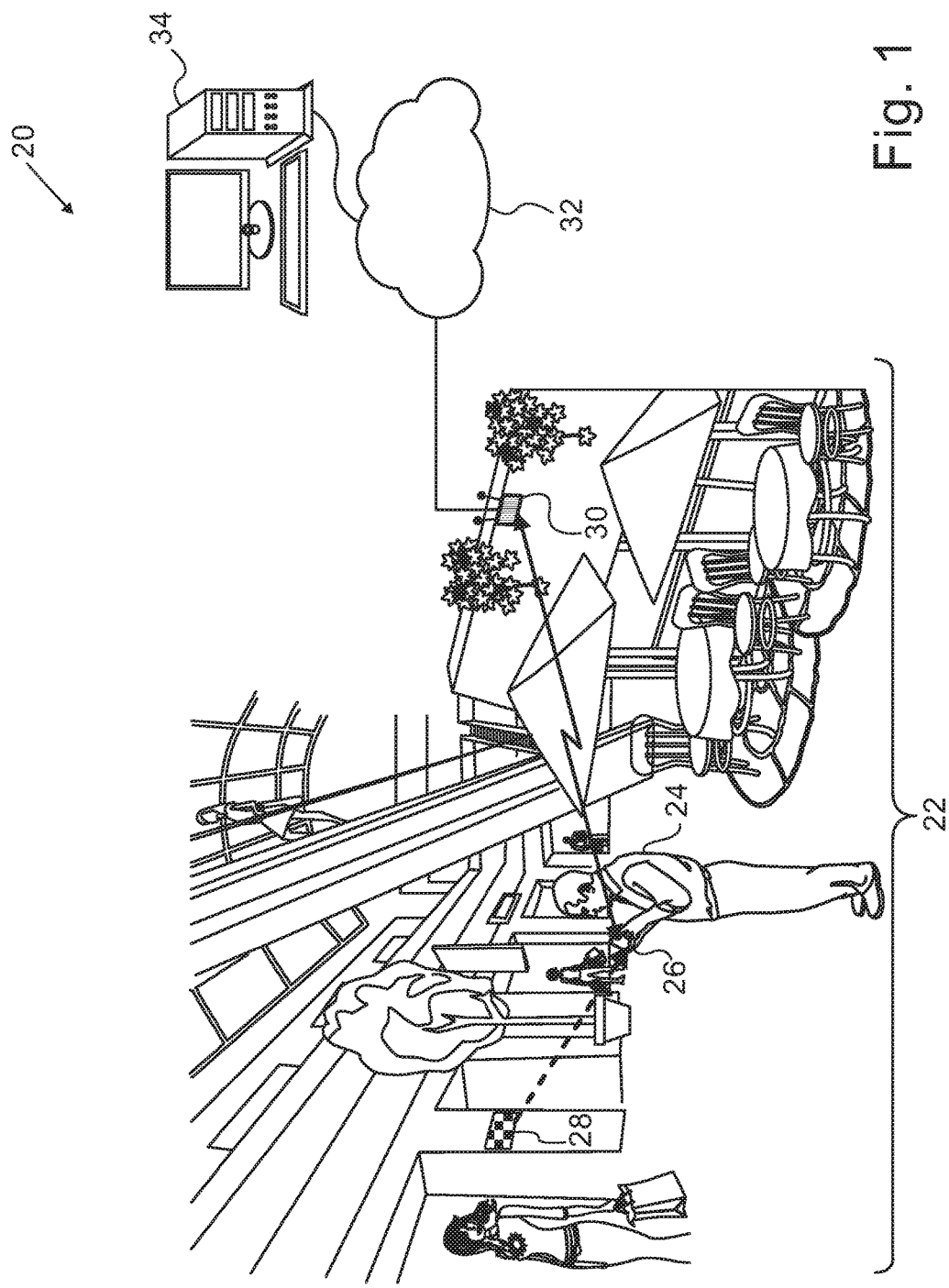
FIG. 1 is a schematic pictorial view of a system for navigation and augmented reality display, in accordance with an embodiment of the present invention.

Outdoor navigation using GPS-enabled mobile computing devices, such as smartphones, tablets and dedicated navigation devices, has gained wide acceptance. In enclosed environments (including both indoor facilities and closely built-up urban areas), however, GPS navigation does not work well, and user requirements are different. Not only does the user want precise directions for finding desired destinations on foot, but the user's needs are typically more complex and dynamic than the those of outdoor GPS-based navigation. For example, the user may wish to locate a specific product or activity, and the navigation itself is in a three-dimensional (3D) environment, often on different floors or levels, with various options for moving from one floor or level to another. Navigation choices will thus depend closely upon the user's objectives and preferences, as well as physical mobility limitations and capabilities.

At the same time, providing optimal instructions for navigation and way-finding within an indoor compound typically requires a detailed and profound knowledge of the structural and functional organization of the compound. Integrating this sort of knowledge generally requires the participation of the operator of the compound, who possesses such knowledge. The operator has strong motivation to fulfill user navigation needs in order to provide a better and more efficient user experience, and specifically to direct users to products and activities that suit their needs while promoting the interests of the operator and of tenants within the compound. Providing this sort of focused navigation instructions increases the likelihood that users will purchase products and services in the compound and will return in the future.

Existing methods of conveying navigation instructions to users in enclosed environments, however, are not well suited to this task. Conventionally, navigation instructions are provided by maps and by generic direction signs and listings of facilities, while promotional content appears on advertising signs and displays. Rather than enhancing user experience, these means of communication may lead users to a state of cognitive overload and confusion, in which much of the information content is lost on them.

One solution to this problem is to enable users to select the points regarding which they wish to receive information, by providing symbols at these points that can be read using an image sensor (such as the camera that is built into most mobile computing devices). Existing types of symbols, however, such as QR codes, unless printed very large, may be hard for the user to find and generally require that the mobile computing device be held close to the symbol in order to capture the image and decode it.

Embodiments of the present invention that are described herein provide novel, computer-readable symbols and methods for using such symbols that overcome the limitations of existing image-based encoding schemes. Each symbol comprises a plurality of polygons meeting at a common vertex and having different, respective colors selected so as to encode a specified digital value. To encode larger digital values, the polygons may be arranged in a tessellation having multiple vertices, wherein each vertex encodes a respective digital value depending on the colors of the polygons that meet at that vertex. The symbol may then encode an extended digital value generated by combining the respective digital values encoded by the multiple vertices. In disclosed embodiments, the colors that are used in the symbol are chosen in a novel manner that enables the mobile computing device to decode them reliably and unambiguously regardless of the lighting conditions in which they are presented.

Typically, the symbols are printed on a tangible medium, such as paper, plastic, or any other printable substrate, which may then be hung or otherwise fixed in desired location, such as on a wall or signpost. Alternatively, such symbols may be presented on an electronic display. The colorful symbols are easily seen and recognized by users. At the same time, images of the symbols can be captured and decoded reliably over a large range of distances, using the sorts of cameras that are built into mobile computing devices and algorithms, as described hereinbelow, that are insensitive to the size of the symbol in the captured image.

The disclosed symbols are thus useful particularly in supporting navigation in enclosed environments and invoking display of location-based augmented-reality information on the screen of a mobile computing device. Such symbols, when coupled with a suitable system for providing location-based information, can be used to enhance user experience in such environments and overcome the shortcomings of existing solutions that were explained above. Although certain embodiments that are described herein focus on these sorts of applications, however, symbols produced in accordance with the principles of the present invention may similarly be used to provide encoded information to image capture and computing devices for other purposes, as well.

System Description

FIG. 1 is a schematic pictorial view of a system 20 for navigation and augmented reality display, in accordance with an embodiment of the present invention. Operation of system 20 is illustrated here in an enclosed environment 22, such as a densely-constructed urban environment or shopping center in the present example. This environment is presented by way of illustration only, however, and not limitation, as the principles of the present invention may be implemented in substantially any user-accessible environment, whether indoors or outdoors.

A user 24 seeking information regarding environment 22 spots a symbol 28 posted on a wall and directs the camera in his smartphone 26 (or other portable computing device) to capture an image containing the symbol. Symbols used in this sort of application context are also referred to herein as "anchors." Symbol 28 comprises a tessellated pattern of polygons—rectangles in this example—of different colors. Such patterns are described in detail with reference to the figures that follow. Although for the sake of simplicity, only a single user and a single anchor are shown in FIG. 1, an operator of or other authority in environment 22 will typically post multiple anchors at various different locations distributed within the environment, in order to enable users to access location-based information at all of these locations. For reliable navigation by users within the environment, it is typically desirable that there be at least one anchor that is clearly visible to users at any given location.

The processor in smartphone 26 processes the captured image in order to decode a digital value that is encoded by symbol 28 and then sends a message, specifying the digital value, to a server 34. As explained below, the message may also includes data regarding the general location of the smartphone, derived from cellular signal strength or any other type of localization information available to the smartphone system, as well as user profile and search requirements. In this communication, smartphone 26 functions as the client device, under control of a suitable application, as described hereinbelow. In the pictured embodiment, smartphone 26 communicates with server 34 via a wireless access point 30, which is connected to a network 32, as is known in the art. Alternatively or additionally, smartphone 26 and server 34 may communicate via a cellular network connection or via any other suitable sort of communication link that is known in the art. Server 34 typically comprises a general-purpose computer, with a processor, memory and communication interface, driven by suitable software to communicate with client devices, such as smartphone 26 and to provide location-based information in the appropriate form.

In an alternative embodiment, a smartphone or other mobile computing device may work offline by pre-caching relevant anchor data and extracting the data later on when a specific anchor is detected. Such an option can be useful for tourists, for example, who may have very limited (if any) data network access.

Figure 2:
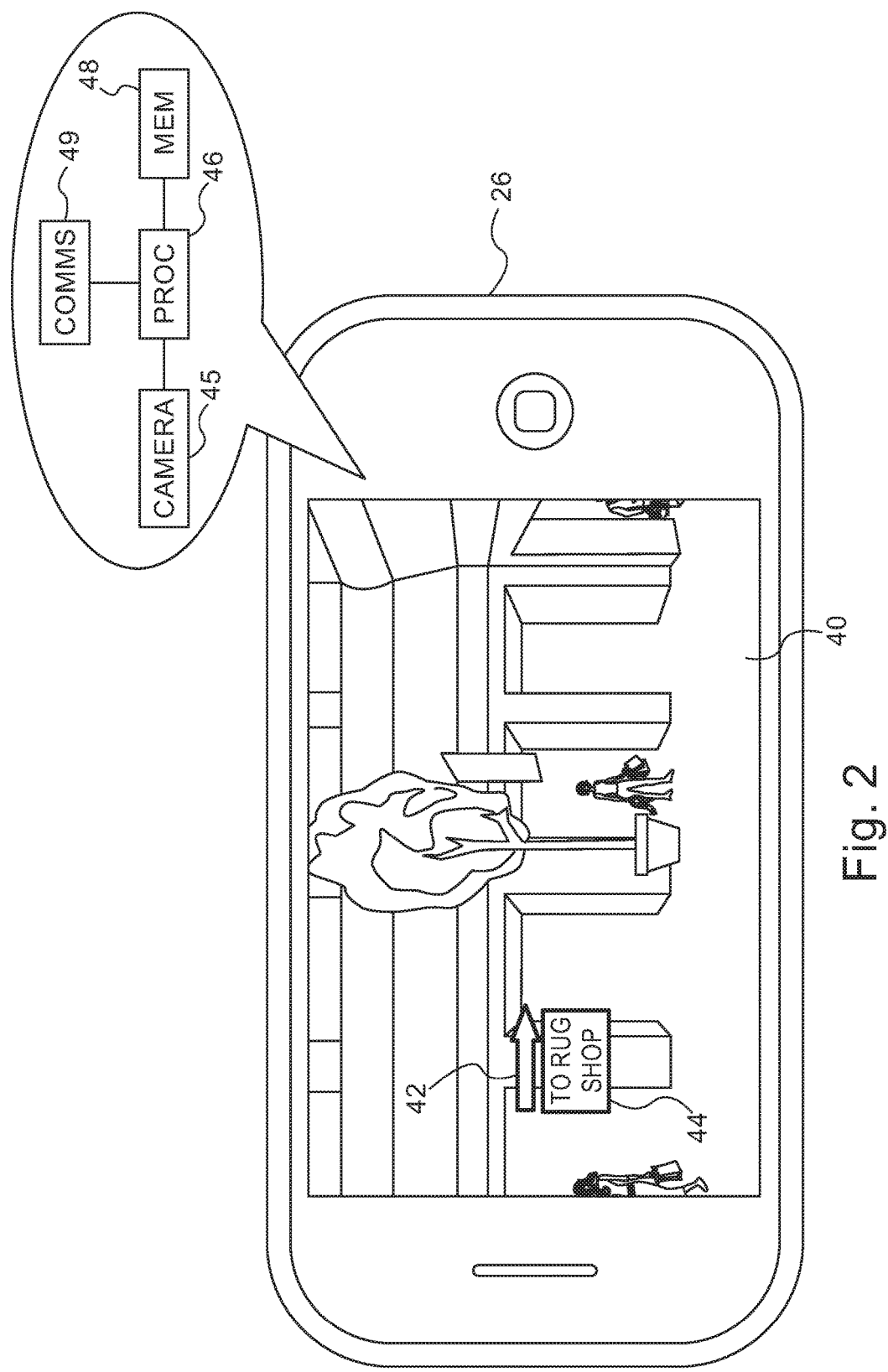
FIG. 2 is a schematic representation of a mobile computing device in the system of FIG. 1, in accordance with an embodiment of the present invention.

FIG. 2 is a schematic representation of smartphone 26, in accordance with an embodiment of the present invention. The smartphone comprises a camera 45, which is coupled to a processor 46 with a memory 48 and communication interface 49, as is known in the art. The user interface of smartphone 26 is typically implemented via a touch-sensitive display 40, although the smartphone may comprise, alternatively or additionally, other types of user interface components, such as a pointing device and/or a keypad. Processor 46 performs the functions that are described herein under the control of suitable software. This software may be downloaded to smartphone 26 in electronic form, over a network, for example. Additionally or alternatively, the software may be stored on tangible, non-transitory media, such as in electronic, optical or magnetic memory.

Smartphone 26 is just one representative example of a mobile computing device that can be used in embodiments of the present invention, and other sorts of devices with a suitable camera, processor, display and communication interface, may equivalently be used to perform the functions described herein. Examples of such devices may include tablets and other portable computers, as well as head-mounted devices, such as Google® glasses, and dedicated navigation devices.

Smartphone 26 captures and processes an image of the scene containing symbol 28 (FIG. 1), as noted above, and sends a message to server 34 containing the digital value encoded by the symbol, generally along with other information as noted above. In response, server 34 returns information with respect to the location of the symbol to the smartphone. The smartphone generally presents this information on display 40, typically superimposed on the image of the scene containing symbol 28. Thus, in the example shown in FIG. 2, assuming that user 24 expressed interest in shopping for a rug, processor 46 superimposes an arrow 42 on display 40, and may also add a textual legend 44 or other graphical information, indicating the direction to the desired destination.

This sort of display, in which computer-generated graphical elements are superimposed on an image of a real environment in such a way as to simulate actual physical elements of the environment, is commonly referred to as an augmented reality display. Arrow 42 and legend 44 are just a simple example of the sorts of augmented-reality elements that may be shown on display 40. The types of elements and their locations, corresponding to the locations of symbols 28 that are posted in the environment, are chosen and programmed by the operator of system 20 in order to provide a rich selection of visual cues and promotional content, possibly including animated elements, and possibly supplemented by audio, which can vary depending on the personal preferences and objectives of different users in environment 22.

Figure 3:
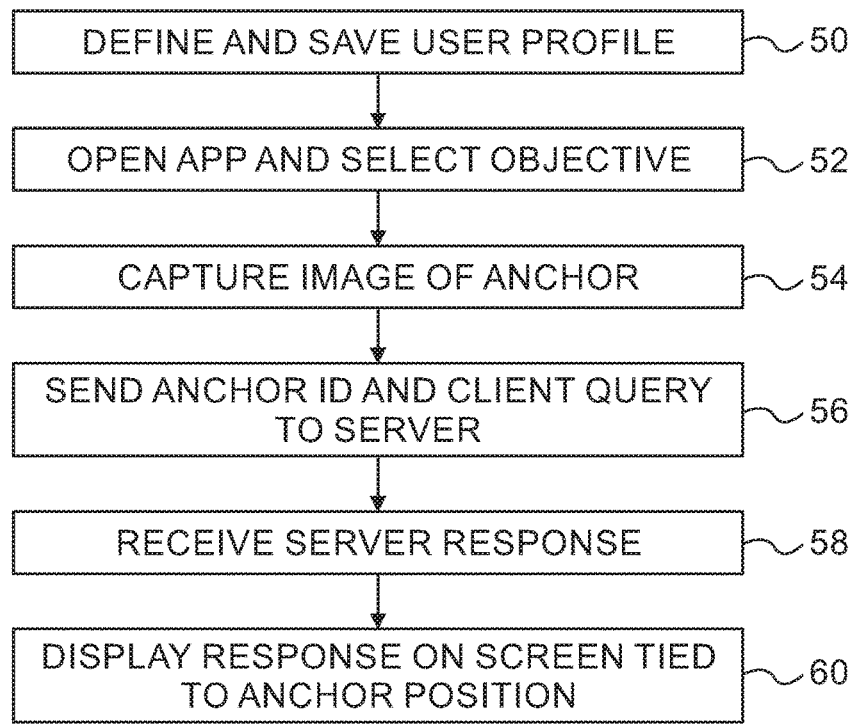
FIG. 3 is a flow chart that schematically illustrates a method for navigation and augmented reality display, in accordance with an embodiment of the present invention.

FIG. 3 is a flow chart that schematically illustrates a method for navigation and augmented reality display, in accordance with an embodiment of the present invention. The method is described, for the sake of convenience and clarity, with reference to the elements of system 20 (FIG. 1) and smartphone 26; but this principles of this method may be applied, mutatis mutandis, in substantially any suitable application environment, using any desired type of mobile computing device.

As a preparatory step, smartphone 26 receives and stores profile information with regard to user 24, at a profile definition step 50. The user may actively input profile information, including personal details and preferences, in response to queries from a client software application running on the smartphone. Alternatively or additionally, the profile information may be assembled automatically based on user behavior and other sources of information. The application itself may be offered to user 24 for download to smartphone 26 when the user first enters environment 22. Additionally or alternatively, the application may be pre-installed on the smartphone.

Within environment 22, user 24 opens the client application and, typically, selects an objective, at a user initiation step 52. The objective may be a particular destination, such as the name of a restaurant or a store, or it may be a type of facility or activity, such as purchasing a rug or finding the nearest toilet. User 24 then visually searches for an anchor (symbol 28), and upon locating it, points smartphone 26 to capture an image of the scene containing the anchor, at an image capture step 54.

Processor 46 in smartphone 26, under control of the client application, processes the captured image in order to extract the digital value that is encoded by symbol 28 (also referred to as the anchor ID), at a processing step 56. Typically, each anchor in environment 22 is different and encodes a unique ID. The processor then sends a query to server 34, indicating the anchor ID, client objective, and relevant information from the user profile. Alternatively or additionally, relevant user profile information may be pre-stored in server 34.

Server 34 processes the query, using stored information regarding environment 22. This information typically includes detailed maps of the environment, which indicate the locations of facilities and services, as well as the locations of all anchors. The server combines this information with the user's location, objectives and preferences, as provided by the user query, and generates a response. Typically, this response comprises one or more graphical elements, and possibly textual and/or audio elements, as well, for directing user 24 to the location that will satisfy his objective. The response may also include promotional information, tailored to the user profile and location.

Server 34 transmits this response to smartphone 26 at a response transmission step 58. Processor 46, under control of the client application, renders the graphical and textual elements of the response to display 40, at a display step 60. Typically, at least the graphical elements appear as augmented-reality components in the image shown on the display, at a location on the display that is superimposed on or otherwise tied to the actual location of the anchor in the image. (Alternatively or additionally, smartphone 26 may pre-cache some or all of the anchors in its immediate vicinity in order to reduce delay in sign generation and display.)

Processor 46 continues to present the information on display 40 for as long as the anchor in question is visible in the images captured by smartphone 26. As the user moves through environment 22, the location of the information on display 40 may change along with the location of the actual anchor in the captured images. If the user progresses to a location at which the initial anchor is no longer visible, he may capture an image containing another anchor, and the information on display 40 will be updated accordingly until the user reaches the desired destination.

Symbol Design

Figure 4:
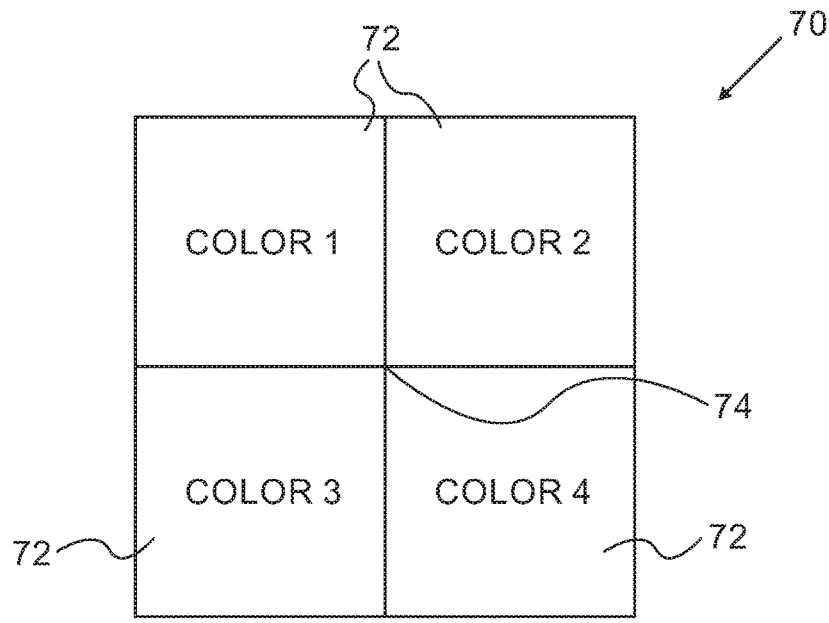
FIGS. 4-7 are schematic representations of multi-color computer-readable symbols, in accordance with an embodiment of the present invention.
Figure 5:
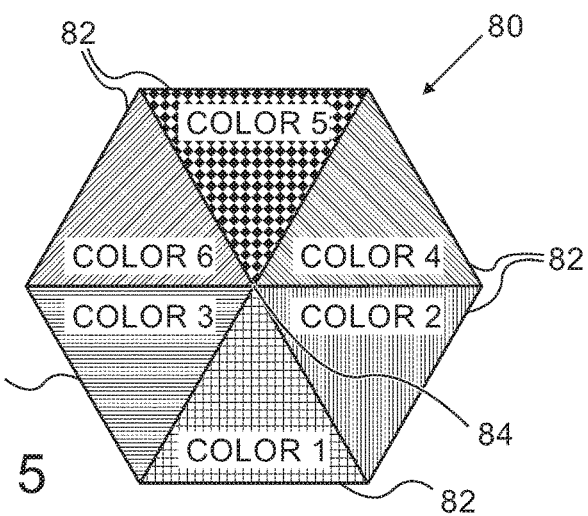

FIGS. 4 and 5 are schematic representations of multi-color computer-readable symbols 70 and 80, in accordance with embodiments of the present invention. Both of symbols 70 and 80 comprise multiple polygons that meet at a common vertex. In the case of symbol 70, the polygons are rectangles 72, meeting at a vertex 74, while in symbol 80, the polygons are triangles 82, meeting at a vertex 84. Alternatively, other sorts of polygons (with five, six, or more sides), not necessarily all the same, may be arranged to meet at a common vertex. Substantially any type of polygons and tiling pattern may be used. It is desirable (although not essential), for ease and reliability of decoding, that all of the polygons that meet at a given vertex be of different colors. Using $N_C$ colors and a vertex common to $N_P$ polygons, the vertex can take $$\frac{N_C!}{(N_C - N_P)!}$$

different forms and thus may be used to encode $$\frac{N_C!}{(N_C - N_P)!}$$

different digital values.

Figure 6:
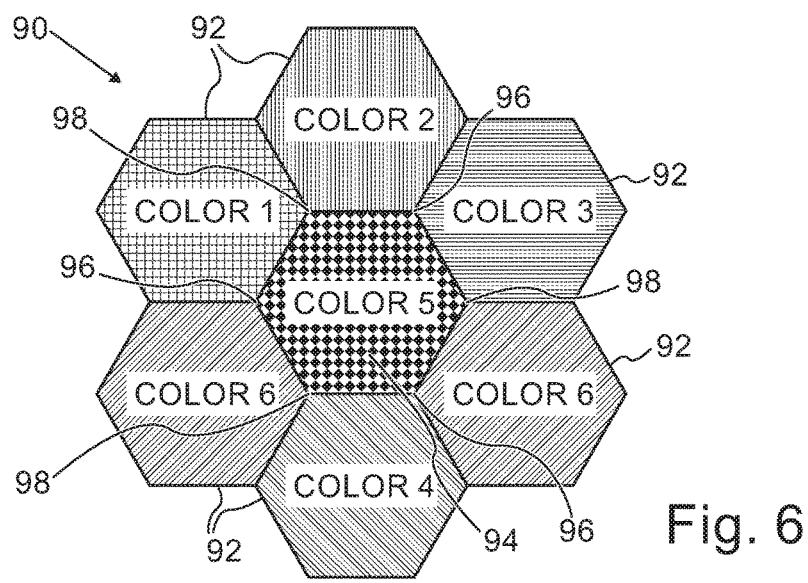
Figure 7:
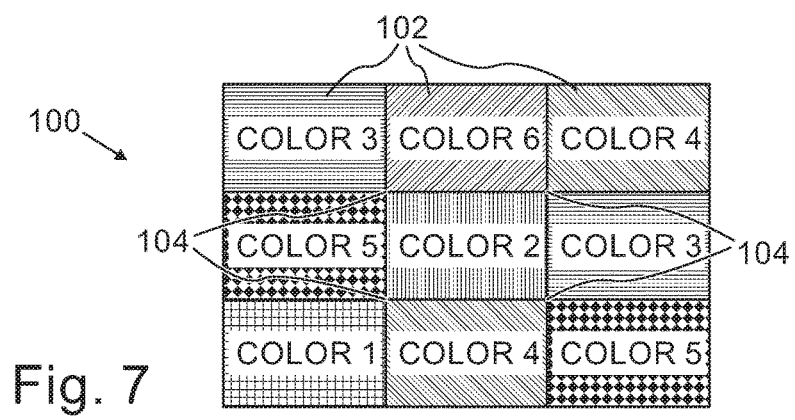

FIGS. 6 and 7 are schematic representations of multi-color computer-readable symbols 90 and 100, in accordance with further embodiments of the present invention. In these embodiments, tessellation of multiple polygonal tiles, with multiple vertices in each symbol, is used to increase the range of digital values that can be encoded and the robustness of identification. (The term "tessellation" is used in the present description and in the claims to refer to tiling of an area with geometrical shapes so as to fill the area without overlaps or gaps between the shapes.) For instance, symbol 90 comprises hexagonal tiles 92, 94, defining six common vertices 96, 98, each with three adjoining tiles. Symbol 100 comprises rectangular tiles 102 arranged in a 3×3 grid so as to define four common vertices 104.

Each of the multiple vertices 96, 104 in symbols 90 and 100 encodes a respective digital value, and these values are combined to generate an extended digital value, for example by concatenating the individual values of the vertices. The vertices in symbol 100, with different arrangements of six colors among tiles 102, may thus be used to encode 126,360 different values. Furthermore, once the locations and distribution of colors around three of vertices 104 are known, the location and the distribution of three of the colors around the fourth vertex are uniquely determined. If the fourth vertex does not conform to the expected location and color distribution, the mobile computing device processing the image will reject the symbol and in this manner will avoid false and erroneous readings of symbol values.

Tessellated, multi-vertex symbols such as symbols 90 and 100 should encode a sufficient number of different digital values for most applications and environments, such as the sort of navigation application that is illustrated in FIG. 1. Symbols containing larger numbers of tiles may be used to encode larger values. Non-symmetrical tessellations may also be used. Ancillary information, such as rough location provided by GPS or cellular signal strength and cell number, may be used to differentiate between symbols having the same value that are deployed at different locations.

A key advantage of the sort of color-based, vertex-centered encoding that is illustrated by the symbols described above (particularly relative to image-based encoding schemes, such as QR codes, that are known in the art) in that the decoding is largely scale-invariant. In other words, the relative size of the symbol in the image captured by the mobile computing device, and hence the distance between the device and the symbol, has little or no impact on decoding over a large range of sizes.

To read the digital value encoded by a candidate vertex, for example, processor 46 may select a candidate vertex location and then compute the color at a sampling point in each polygon around the vertex at a certain displacement from the vertex. These sampling points, referred to herein as probes or probe locations, are generally located along the angle bisectors between the color edges of the polygons. The number of probes and the angles between them are thus determined by the type and number of polygons around each vertex, as illustrated in the preceding figures. (The candidate vertex locations, around which the sampling points are taken, may be found by locating the color edges that meet at the vertex and taking the location at the intersection of the color edges, or they may be chosen by any other suitable criterion or even at random.) As long as the polygonal tiles are not smaller than a certain displacement vector $\vec{D}$, color probing of the polygons at such a displacement will yield the same colors regardless of the scale.

This sort of vertex-centered encoding is also robust to rotations: As long as the rotation is smaller than half of the smallest vertex angle (for example, less than 45° for a rectangular tessellation), there is no need to adjust the color probing direction along the angle bisectors. Information provided by an inertial sensor (such as an accelerometer) that is available in most smartphones and other mobile computing devices can be used to disambiguate and correct the color probing angle regardless of rotation of the camera itself. The vertices themselves serve as registration marks, so that there is no need for additional registration marks to be added to the anchors.

Color Scheme

Substantially any set of colors that can be distinguished by an image sensor can be used to color the polygonal tiles around the vertices in symbols according to embodiments of the present invention. The inventors have found, however, that a certain family of color schemes is advantageous in supporting reliable, efficient color identification using commonly-available image sensors. Color schemes of this sort can be applied in producing symbols for the vertex-based encoding methods described above. Such color schemes are useful not only in this particular encoding method, however, but also in other techniques of color-based encoding.

In one embodiment of the invention, the number of colors is set to $N_c$=6, using the set of primary colors "Red" (R), "Green" (G) and "Blue" (B) and their respective complements "Magenta" (M), "Cyan" (C) and "Yellow" (Y). This color-set has several advantages:

Primary colors, and even more so, interfaces joining several such colors, are relatively rare in natural environments. This feature is beneficial for the identification of anchors by humans and computers and aids in robust decoding.

RGB is the native color-space of digital images generated by cameras. The complementary colors can be easily computed as M=G+B, C=R+B, Y=R+G.

$N_c$=6 is sufficient for rectangular, hexagonal and triangular tessellations, as illustrated above.

The present embodiment uses a three-dimensional binary presentation of the colors:
1. R=(1,0,0)
2. G=(0,1,0)
3. B=(0,0,1)
4. C=(0,1,1)
5. M=(1,0,1)
6. Y=(1,1,0)

Each of the three dimensions represents a Primary Color Channel (PCC).

In the present embodiment, the colors surrounding any given common vertex are all required to be different from one another and to vary in the binary representation of each of the PCCs, i.e., a vertex around which all the surrounding colors have the same R, G or B bit value is not permitted. For example a vertex of three tiles of colors R, G, B complies with the criterion since no binary PCC is constant for all tiles. On the other hand, three tiles of colors C, G, B do not comply with the criterion, since the red binary PCC is zero for all of them. In a constellation of six colors, this restriction applies only to hexagonal tessellations, since any arrangement of triangular or rectangular tiles of different colors around a vertex will satisfy the restriction.

Rectangular tessellation of symbols is advantageous because it geometrically matches the tessellation of the sensor elements that are used in imaging the symbols and also tends to match the spaces available for posting anchors in common enclosed environments. The rectangular tiles may readily be extended horizontally in order to compensate for the horizontal foreshortening that may result when images of the anchor are captured at an angle, as will often be the case, rather than head-on.

Figure 8:
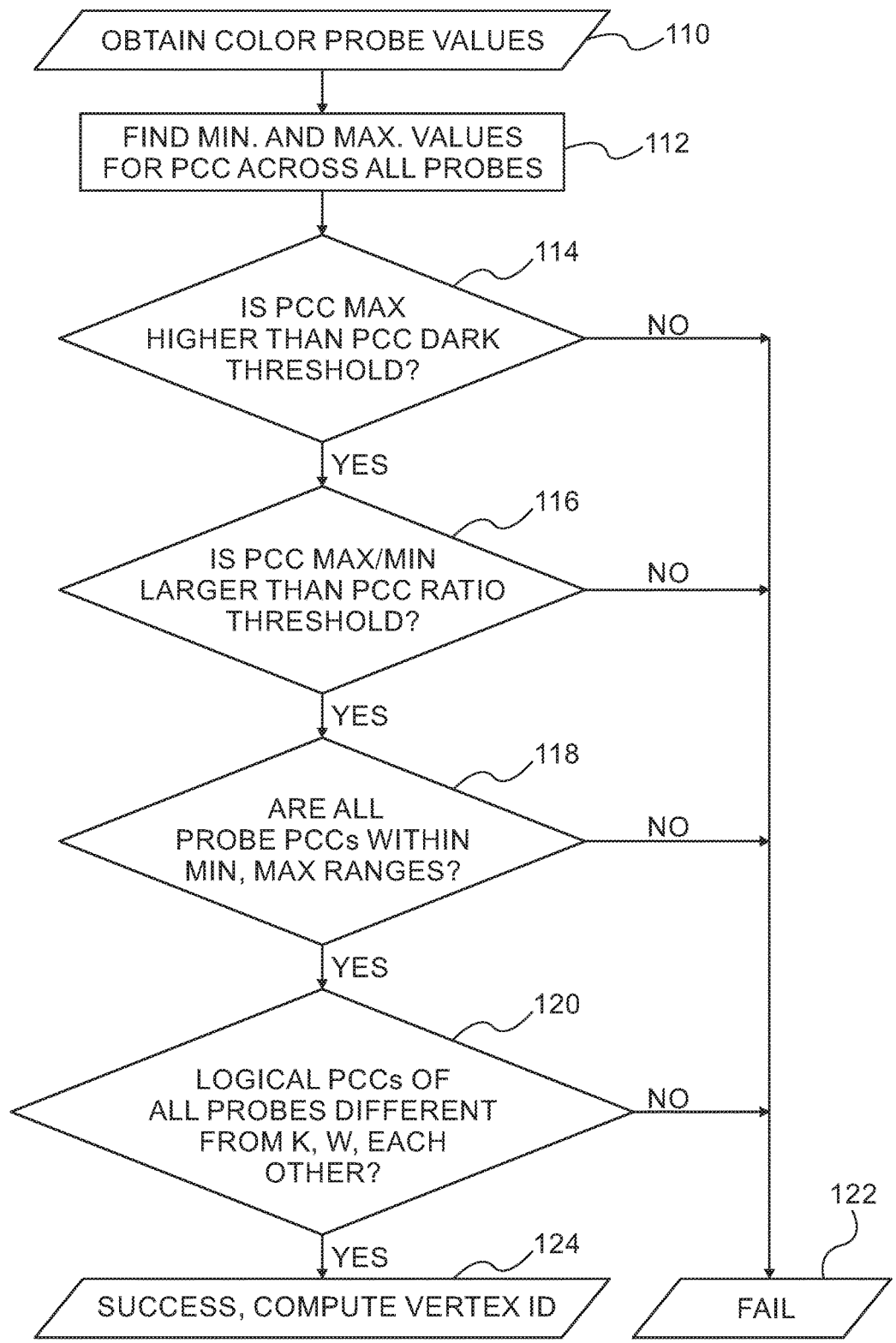
FIG. 8 is a flow chart that schematically illustrates a method for decoding a multi-color symbol, in accordance with an embodiment of the present invention.

FIG. 8 is a flow chart that schematically illustrates a method for decoding a multi-color symbol of the above design, such as symbol 100, in accordance with an embodiment of the present invention. For each image coordinate vector r=(x, y), representing a given vertex location in an image of a symbol, processor 46 extracts $N_p$ color-probe values $V_p$ (p=1, ..., $N_p$), at a color probing step 110. These values correspond to the image color intensities $I(v_p)$ at the probe coordinates $v_p=r+d_p$. The displacement vectors $d_p$ all have the same length $|d_p|=d$, but different orientations corresponding to the anchor geometry. Specifically, for rectangular tessellations, $d_1$=(D, D), $d_2$=(−D, D), $d_3$=(−D, −D) and $d_4$=(D, −D), with D=Round $[d/\sqrt{2}]$ being a natural number.

In general, the angle between neighboring displacement vectors is $2\pi/N_p$. As noted earlier, this angular distribution of the displacement vectors implies robustness with respect to image rotations of up to $\pi/N_p$. For triangular tessellations, $d_p$=Round[d (sin $\phi_p$, cos $\phi_p$)], with $\phi p$=(2p−1)$\pi/N_p$ for p=1, ..., 6. For hexagonal tessellations, the six vectors are separated into two sets of even and odd p, corresponding to the two possible types of vertices, as represented by vertices 96 and vertices 98 in FIG. 6.

The length parameter D determines the smallest detectable anchor image dimension. Very small values (such as D=1 or 2 pixels) correspond to very local probe-sets, which in principle can pick up anchors that are captured by a small number of pixels (of the order of $D^2$). Anchor identification becomes more robust with larger values of D, but generally works well for any D≥3. Even large symbols can still be robustly identified with small values of D, since the vertices are defined locally, independently of the anchor size. Thus using one choice of D is sufficient to detect both small and large anchors.

The next stage is to classify each probe as one of the $N_c$ colors. FIG. 8 illustrates a robust method for this purpose, which implements a sort of local white balance in the native RGB space and imposes a set of requirements that automatically reject candidate vertices that are potentially unreliable. Specifically, processor 46 first finds the maximal intensity value $I_c^{max}=\max_p(\{I_c(v_p)\})$ and minimal intensity value $I_c^{min}=\min_p(\{I_c(v_p)\})$ for each of the three pure (RGB) color channels (PCC) at each of the probes, at a PCC evaluation step 112. The first requirement, that the probe with the maximal value of any given PCC has to be above some absolute dark threshold $\Delta_c^{min}$, i.e., $I_c^{max}>\Delta_c^{min}$, is evaluated at a dark threshold evaluation step 114. The second requirement, that the probe with the minimal value of a given PCC must be significantly smaller than the corresponding maximal value of this color, i.e., $I_c^{min}/I_c^{max}<\rho_c^{min}$, is evaluated at a ratio threshold evaluation step 116. If the color probe values fail to meet these requirements, processor 46 rejects the candidate vertex, at a failure step 122.

Finally, based on the range $R_c=I_c^{max}-I^{min}$ between the extreme values in each PCC, processor 46 assigns PCC binary values $V_{p,c}$ to each probe based on relative thresholds $\tau_c^{min}$ and $\tau_c^{max}$, such that $0<\tau_c^{min}$, $\tau_c^{max}<1$, with $\tau_c^{min}+\tau_c^{max}\leq 1$, at a PCC assignment step 118. Specifically:

$V_{p,c}=0$ if $I_c(v_p)<I_c^{min}+\tau_c^{min}R_c$, $V_{p,c}=1$ if $I_c(v_p)>I_c^{max}-\tau_c^{max}R_c$, and $V_{p,c}$ is undefined otherwise. If any $V_{p,c}$ is undefined at this stage, the test for a vertex fails, and the process again terminates at step 122.

If the candidate vertex successfully passes steps 114-118, processor 46 assigns a specific color to each probe, in the form of a triplet $(V_{p,r}, V_{p,g}, V_{p,b})$ in the binary PCC representation. Yet beyond the six-color scheme defined above, the binary triplets $(V_{p,r}, V_{p,g}, V_{p,b})$ can have two additional inadmissible configurations: K=(0,0,0) and W=(1,1,1). Processor 46 checks that none of the binary PCC triplets is K or W and that there are no two probes around the candidate vertex that have the same color value, at a color checking step 120. The latter condition is checked by pairwise comparisons between the probes.

If these final conditions are satisfied, processor 46 identifies as a vertex the point corresponding to the center of the clusters of pixels that satisfy the color vertex conditions, at a vertex identification step 124. The processor assigns a vertex ID by combining the individual polygon color values, for example by turning the three-bit binary PCC value of each probe into a three-digit binary number and then concatenating the $N_p$ probes into a single binary number. The ID for the entire, multi-vertex anchor may be found, for example, by concatenating the individual IDs of the vertices.

Robust detection of vertices can be affected strongly by the choice of colors. Since anchors may occupy only a small portion of the captured image, their illumination typically can be very different from the overall image illumination, which affects the exposure and gain applied by the camera. In fact, the inventors have found that the readout of the PCC value for a given anchor tile can typically vary by a factor of three with respect to the applied exposure and gain that would be optimal for this tile. For example, if most of the image is in full sunlight, but the anchor appears in the shadow, then its PCC values will be much lower compared to an image in which the anchor is also in full sunlight. Conversely, if most of the image is in the shade, but the anchor happens to be more strongly illuminated, then its PCC values will be much higher.

A further constraint to be taken into account is that reflective colors of real objects (including color pigments) have physical limitations in terms of color separation. As a result, a captured RGB image of a "pure color" will necessarily also have non-negligible contributions in the "wrong" channels. For example, a naïve attempt to produce a "pure Green" on a calibrated printer complying with the well-known Specifications for Web Offset Publications (SWOP), with ink density CMYK=(100%, 0,100%, 0), could result in color values in a captured image given by RGB=(0, 166, 80), with the "wrong" channel of red having a non-negligible value of 80. To avoid this sort of situation, which may lead to loss or misidentification symbol vertices, an embodiment of the present invention provides a scheme for co-optimization of the parameters for color detection that are described above with the color reproduction capabilities of the device that is to be used to actually produce the anchors.

In order to support this sort of scheme, a method to score a color set is introduced. The method scores a color set according to the actual RGB values of the color set anchor tiles in a captured image, or alternatively uses the sRGB color space to predict these values. (The sRGB color space is defined by IEC Specification 61966-2-1:1999 and is commonly used in calibrating color image sensors and cameras.) A color set for anchor symbols is then chosen in a way that optimizes the score.

To compute the score, for a given set of RGBCMY colors, $H^1_c$ and $L^1_c$ are taken, respectively, to be the highest and lowest observed values of a color c that is 1 in the binary representation of the color set. Similarly, $H^0_c$ and $L^0_c$ are the highest and lowest observed values of a color c that is 0 in the binary representation of the color set. In other words, $H^1_c$ and $L^1_c$ are the highest and lowest observed values, respectively, of the color c among the color elements that are expected to contain the color c, while $H^0_c$ and $L^0_c$ are the highest and lowest observed values of the color c among the color elements that are expected not to contain the color c. For c=red, for example, red, yellow and magenta color elements are expected to contain this color, while green, blue and cyan color elements are expected not to contain it.

For example, choosing a naïve color production scheme on a on a calibrated SWOP printer:
R is produced by CMYK ink density (0,100%, 100%, 0)
G is produced by CMYK ink density (100%, 0,100%, 0)
B is produced by CMYK ink density (100%, 100%, 0,0)
C is produced by CMYK ink density (100%, 0,0,0)
M is produced by CMYK ink density (0,100%, 0,0)
Y is produced by CMYK ink density (0,0,100%, 0)
For a camera calibrated according to the sRGB specification, the observed color values will then be:
Captured R—(237,28,36)
Captured G—(0,166,80)
Captured B—(46,48,146)
Captured C—(0,173,239)
Captured M—(236,0,140)
Captured Y—(255,242,0)
These measurements lead to the following high and low values for each color:
$H^0_{Red}$=46 highest red out of G, B, C, anchor colors of red=0 in the binary representation $L^0_{Red}$=0 lowest red out of G, B, C, anchor colors of red=0 in the binary representation $H^0_{Green}$=48 highest green out of R, B, M, anchor colors of green=0 in the binary representation $L^0_{Green}$=0 lowest green out of R, B, M, anchor colors of green=0 in the binary representation $H^0_{Blue}$=80 highest blue out of R, G, Y, anchor colors of blue=0 in the binary representation $L^0_{Blue}$=0 lowest blue out of R, G, Y, anchor colors of blue=0 in the binary representation $H^1_{Red}$=255 highest red out of R, M, Y, anchor colors of red=1 in the binary representation $L^1_{Red}$=236 lowest red out of R, M, Y, anchor colors of red=1 in the binary representation $H^1_{Green}$=242 highest green out of G, C, Y, anchor colors of green=1 in the binary representation $L^1_{Green}$=166 lowest green out of G, C, Y, anchor colors of green=1 in the binary representation $H^1_{Blue}$=239 highest blue out of B, C, M, anchor colors of blue=1 in the binary representation $L^1_{Blue}$=140 lowest blue out of B, C, M, anchor colors of blue=1 in the binary representation In order to reduce false positives in common vertex detection, each dark-threshold $\Delta_c^{min}$ is chosen to be as large as possible. The limit to increasing the dark-threshold $\Delta_c^{min}$ is reached at the point at which it prevents detection of a vertex, when due to illumination conditions $\Delta_c^{min}$ becomes larger than $L^1_c$. Therefore, maximizing the dark-threshold $\Delta_c^{min}$ is equivalent to choosing a large value of $L^1_c$. Similarly, the minimal gain ratio $\rho_c^{min}$ should be as small as possible, which is equivalent to choosing a large value $1/(H^0_c+\delta)$. (The constant value $\delta$ is introduced in order to prevent singularities at $H^0_c$=0.) Combining the above two observations into a score that encourages robustness against illumination variation corresponds to maximizing.

$$S^{Intensity} \equiv \prod_c \frac{L^1_c}{(H^0_c + \delta)}.$$

Setting $\delta$ to the maximal value of 255 (assuming an eight-bit-per-color representation) conveniently constrains the score to the range of 0 to 1.

Stringent choice of the values of $\tau_c^{min}$ and $\tau_c^{max}$ reduces significantly the chance of encountering a false positive vertex, thus increasing the reliability of vertex detection. The most stringent values $\tau_c^{min}$ and $\tau_c^{max}$ can be found by realizing that their lower bounds are given by $(H^0_c-L^0_c)/(L^1_c-L^0_c)$ and $(H^1_c-L^1_c)/(H^1_c-H^0_c)$, respectively. Since $\tau_c^{min}+\tau_c^{max} \geq 1$, these requirements may conveniently be combined into maximizing.

$$S^{reliability} \equiv \prod_c \left(1 - \frac{H^0_c - L^0_c}{L^1_c - L^0_c} - \frac{H^1_c - L^1_c}{H^1_c - H^0_c}\right).$$

The two scores are combined into a single optimization score:

$$S \equiv S^{reliability} * S^{Intensity}.$$

For each means used for anchor color production, an optimization process of the above mentioned score is carried out to obtain the best set of anchor production colors.

For the naïve anchor color production scheme mentioned above, the optimization score cannot even be computed, since upon calculating:

$$\tau_{Blue}^{min}=(H^0_{Blue}-L^0_{Blue})/(L^1_{Blue}-L^0_{Blue})=0.57 \text{ and}$$

$$\tau_{Blue}^{max}=(H^1_{Blue}-L^1_{Blue})/(H^1_{Blue}-H^0_{Blue})=0.62, \text{ it is found that the range sum rule } \tau_c^{min}+\tau_c^{max} \geq 2 \text{ is violated}$$

Tables I and II below show the results of optimization of the anchor color production scheme for two different types of print inks, in order to minimize $T_c^{min}+T_c^{max}$ and thus maximize the score S for an sRGB sensor:

TABLE I

| U.S. WEB COATED (SWOP) | | | | | | |
|---|---|---|---|---|---|---|
| | Anchor R | Anchor G | Anchor B | Anchor C | Anchor M | Anchor Y |
| Cyan Ink density [%] | 1 | 71 | 92 | 75 | 0 | 3 |
| Magenta Ink density [%] | 91 | 0 | 91 | 23 | 90 | 45 |
| Yellow Ink density [%] | 79 | 100 | 0 | 41 | 0 | 86 |
| Black Ink density [%] | 0 | 20 | 0 | 1 | 0 | 1 |
| sRGB Red | 236 | 60 | 60 | 60 | 238 | 237 |
| sRGB Green | 62 | 153 | 62 | 152 | 61 | 153 |
| sRGB Blue | 62 | 60 | 153 | 153 | 150 | 61 |
| Colorimetric L | 54 | 56 | 30 | 58 | 56 | 71 |
| Colorimetric a | 66 | −43 | 21 | −28 | 72 | 27 |
| Colorimetric b | 42 | 39 | −51 | −9 | −7 | 59 |

TABLE II

| COATED FOGRA27(ISO 12647-2-2: 2004) | | | | | | |
|---|---|---|---|---|---|---|
| | Anchor R | Anchor G | Anchor B | Anchor C | Anchor M | Anchor Y |
| Cyan Ink density [%] | 0 | 80 | 95 | 77 | 0 | 9 |
| Magenta Ink density [%] | 87 | 0 | 85 | 10 | 86 | 42 |
| Yellow Ink density [%] | 85 | 100 | 0 | 49 | 0 | 89 |
| Black Ink density [%] | 0 | 0 | 0 | 0 | 0 | 0 |
| sRGB Red | 229 | 31 | 29 | 35 | 230 | 230 |

TABLE II-continued

COATED FOGRA27(ISO 12647-2-2: 2004)

|  | Anchor R | Anchor G | Anchor B | Anchor C | Anchor M | Anchor Y |
|---|---|---|---|---|---|---|
| sRGB Green | 62 | 161 | 62 | 161 | 61 | 160 |
| sRGB Blue | 46 | 45 | 143 | 143 | 140 | 44 |
| Colorimetric L | 54 | 56 | 30 | 58 | 56 | 71 |
| Colorimetric a | 66 | −43 | 21 | −28 | 72 | 27 |
| Colorimetric b | 42 | 39 | −51 | −9 | −7 | 59 |

Thus, as can be seen in the above examples, the use of the scoring criteria set forth above in choosing the proportions of cyan, magenta and yellow pigments to apply to a substrate results in symbols whose color elements (polygonal tiles in the present example) can be unambiguously identified in an image of the symbol as red, green, blue, cyan, magenta or yellow color elements. One reason is that when measured in an sRGB color space, the red, green and blue color elements have a respective red, green or blue intensity that is greater than twice the intensities of the other primary RGB colors. Similarly, for the cyan color elements, the blue and green intensities are both greater than twice the red intensity; for the magenta color elements, the red and blue intensities are both greater than twice the green intensity; and for the yellow color elements, the red and green intensities are both greater than twice the blue intensity. As a result, low values of $\tau_c^{min}$ and $\tau_c^{max}$ can be used to separate the different colors robustly and reliably.

Another advantageous result of the use of the scoring criteria described above is that all the intensity values of the resulting colors are clustered around either a particular low value or a particular high value, but not in between. For example, the blue sRGB values in Table I are all within the either range 61±1 or the range 151±2. Color schemes that are known in the art do not exhibit this sort of behavior. Using the reliability score defined above, color sets can generally be defined such that the component of $S^{reliability}$, $$\left(1 - \frac{H_c^0 - L_c^0}{L_c^1 - L_c^0} - \frac{H_c^1 - L_c^1}{H_c^1 - H_c^0}\right),$$

for any PCC c (red, green or blue) is greater than 0.8.

As noted earlier, although the above color schemes are described here specifically with reference to vertex-based encoding methods using colored polygonal tiles, the same sort of scheme can be used in producing other sorts of color elements used in other color-based encoding schemes.

By using the sRGB color space to evaluate the color score, the choice of pigments to use in producing anchors can be optimized with respect to the known spectral properties of the Color Filter Array (CFA) and image sensor that are used in common smartphones and other mobile computing devices. The inventors have found that although different vendors use different CFAs, the intersections between the green filter and blue filter response curves, at about 500 nm (i.e., the wavelength at which the green filter attenuation is equal to that of the blue filter), and between the green filter and red filter spectral response curves, at about 580 nm (the wavelength at which the green filter attenuation is equal to that of the red filter), are almost identical among all major vendors. These spectral intersection points are not sensitive to variations in illumination.

The two stable intersection points at 500 nm and 580 nm define a set of six colors according to their spectral reflectivities:

"Red" $- C_B(\lambda) = \begin{cases} 1, \lambda > 580 \text{ nm} \\ 0, \lambda \le 580 \text{ nm} \end{cases}$ "Green" $- C_G(\lambda) = \begin{cases} 1, 500 \text{ nm} < \lambda < 580 \text{ nm} \\ 0, \lambda \le 500 \text{ nm or } \lambda \ge 500 \text{ nm} \end{cases}$ "Blue" $- C_B(\lambda) = \begin{cases} 1, \lambda < 500 \text{ nm} \\ 0, \lambda \ge 500 \text{ nm} \end{cases}$ "Cyan" $- C_C(\lambda) = \begin{cases} 1, \lambda < 580 \text{ nm} \\ 0, \lambda \ge 580 \text{ nm} \end{cases}$ "Magenta" $- C_M(\lambda) = \begin{cases} 1, \lambda \le 500 \text{ nm or } \lambda \ge 500 \text{ nm} \\ 0, 500 \text{ nm} < \lambda < 580 \text{ nm} \end{cases}$ "Yellow" $- C_Y(\lambda) = \begin{cases} 1, \lambda > 500 \text{ nm} \\ 0, \lambda \le 500 \text{ nm} \end{cases}$ Choosing combinations of pigments with properties as close as possible to those specified by the above formulas will give anchor colors that maximize the difference between the R, G and B values in an image of the anchor. Specifically, for each PCC R, G and B, $C_R$ is optimized in terms of maximum differentiation from red-green and red-blue; $C_G$ is optimized in terms of maximum differentiation from green-red and green-blue; $C_R$ is optimized in terms of maximum blue-red and blue-green differentiation; "Cyan" $C_C$ is optimized in terms of maximum green-red and blue-red differentiation; "Magenta" $C_M$ is optimized in terms of maximum red-green and blue-green differentiation; and "Yellow" $C_Y$ is optimized in terms of maximum red-blue and green-blue differentiation. Since the typical wavelength range for the sensor sensitivity is limited to 390 nm<λ<680 nm (due to infrared cutoff), the anchor color set spectral characteristics are also limited to this range.

In producing anchors, it is desirable that the anchors exhibit Lambertian reflectance (matte), which minimizes the effect of specular reflections. Alternatively, in poor lighting conditions, the anchor may be covered by a retro-reflective coating, such as a light-reflecting clear coating made of high-index microscopic glass beads. When a beam of light, such as the light generated by the camera flash, strikes from the anchor surface, the coating reflects back the underlying anchor colors.

As noted earlier, the above choices of colors are appropriate not only for the sort of multi-polygon tiled symbols described earlier, but also for color-based computer-readable symbols of other types. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A system, comprising:
at least one tangible medium having a machine-readable symbol printed thereon, such that the symbol comprises a plurality of polygons meeting at a common vertex and having different, respective colors that are selected and applied to the tangible medium so as to encode the specified digital value, wherein the digital value is encoded by assigning to each color a three-bit code comprising respective binary values representing three primary color components of the colors of the polygons, and combining the digital codes to give the specified digital value, and
wherein the colors of the polygons are selected and applied to the tangible medium such that none of the binary values is constant over all of the polygons meeting at the common vertex; and
a client device configured to decode the digital value that is encoded by the machine-readable symbol.

2. The system according to claim 1, wherein the colors of the polygons do not include black and white.

3. The system according to claim 1, wherein the symbol comprises a tessellation having multiple vertices encoding multiple, respective digital values depending on the colors of the polygons that meet at each of the vertices, wherein the colors of the polygons meeting at each of the multiple vertices are selected such that none of the binary values is constant over all of the polygons meeting at any given vertex, and wherein the symbol encodes an extended digital value generated by combining the multiple, respective digital values encoded by the multiple vertices.

4. The system according to claim 1, wherein the colors of the polygons are selected from a color group consisting of red, green, blue, cyan, magenta and yellow, and having three-bit codes (1,0,0), (0,1,0), (0,0,1), (0,1,1), (1,0,1) and (1,1,0), respectively.

5. The system according to claim 1, wherein the symbol is provided without any dedicated registration marks.

6. A system, comprising:
at least one tangible medium having a machine-readable symbol printed thereon, such that the symbol encodes a specified digital value in a set of color elements having different, respective colors, to be identified in an image of the symbol as red, green, blue, cyan, magenta and yellow color elements, respectively,
wherein the symbol is produced by applying cyan, magenta and yellow pigments to a substrate so as to produce the color elements, such that the color elements exhibit the following red, green, and blue intensity characteristics when measured in an sRGB color space:
for the red color elements, the red intensity is greater than twice the blue and green intensities;
for the green color elements, the green intensity is greater than twice the red and blue intensities;
for the blue color elements, the blue intensity is greater than twice the red and green intensities;
for the cyan color element, the blue and green intensities are both greater than twice the red intensity;
for the magenta color element, the red and blue intensities are both greater than twice the green intensity;
and for the yellow color element, the red and green intensities are both greater than twice the blue intensity; and
a client device configured to decode the digital value that is encoded by the machine-readable symbol.

7. The system according to claim 6, wherein the color elements comprise polygons, and wherein the symbol comprises a plurality of the polygons meeting at a common vertex.

8. A system, comprising:
at least one tangible medium having a machine-readable symbol printed thereon, such that the symbol encodes a specified digital value in a set of color elements having different, respective colors, to be identified in an image of the symbol as red, green, blue, cyan, magenta and yellow color elements, respectively,
wherein the symbol is produced by applying cyan, magenta and yellow pigments to a substrate so as to produce the color elements, such that the color elements exhibit red, green, and blue intensity characteristics when measured in an sRGB color space that satisfy a relation:

$$\left(1 - \frac{H_c^0 - L_c^0}{L_c^1 - L_c^0} - \frac{H_c^1 - L_c^1}{H_c^1 - H_c^0}\right) > 0.8$$

for each color c=red, green, blue,
wherein Hic and Lic are the highest and lowest observed values, respectively, of the color c among the color elements that are expected to contain the color c, while H0c and Loc are the highest and lowest observed values of the color c among the color elements that are expected not to contain the color c; and
a client device configured to decode the digital value that is encoded by the machine-readable symbol.

9. The system according to claim 8, wherein the color elements comprise polygons, and wherein the symbol comprises a plurality of the polygons meeting at a common vertex.

10. A method for encoding information, comprising:
specifying a digital value;
defining a encoding scheme in which a plurality of colors encode respective three-bit codes, such that each color is assigned a respective three-bit code comprising binary values representing three primary color components of the color; and
encoding the specified digital value using the encoding scheme by arranging a plurality of polygons, having different, respective colors selected so as to encode the specified digital as a combination of the respective three-bits codes of the colors, to meet at a common vertex, while selecting the colors of the polygons such that none of the binary values is constant over all of the polygons meeting at the common vertex.

11. The method according to claim 10, wherein the symbol comprises a tessellation having multiple vertices encoding multiple, respective digital values depending on the colors of the polygons that meet at each of the vertices, wherein the colors of the polygons meeting at each of the multiple vertices are selected such that none of the binary values is constant over all of the polygons meeting at any given vertex, and
wherein the symbol encodes an extended digital value generated by combining the multiple, respective digital values encoded by the multiple vertices.

12. The method according to claim 10, wherein the colors of the polygons are selected from a color group consisting of red, green, blue, cyan, magenta and yellow, and having three-bit codes (1,0,0), (0,1,0), (0,0,1), (0,1,1), (1,0,1) and (1,1,0), respectively.

13. The method according to claim 10, wherein the symbol is provided without any dedicated registration marks.

14. The method according to claim 10, and comprising capturing an image of the symbol, and decoding the symbol by probing the colors in the image at probe locations disposed at multiple angles around the common vertex.

15. The method according to claim 14, wherein the probe locations are all disposed at the same distance from the common vertex.

16. The method according to claim 10, wherein the polygons are rectangles.

\* \* \* \* \*